United States Patent Office 3,399,979
Patented Sept. 3, 1968

3,399,979
PROCESS FOR PRODUCING METAL NITRIDE FIBERS, TEXTILES AND SHAPES
Bernard H. Hamling, Warwick, N.Y., assignor to Union Carbide Corporation, a corporation of New York
No Drawing. Continuation-in-part of applications Ser. No. 451,326, Apr. 27, 1965, Ser. No. 523,549 and Ser. No. 523,550, Jan. 28, 1966, and Ser. No. 576,840, Sept. 2, 1966, which are continuations-in-part of application Ser. No. 320,843, Nov. 1, 1963. This application Dec. 19, 1966, Ser. No. 602,572
7 Claims. (Cl. 23—347)

ABSTRACT OF THE DISCLOSURE

A process for producing metal nitride articles is disclosed. The process employs the following steps:
(a) Impregnating a preformed organic polymeric material, such as rayon fiber, with a metal-containing compound, preferably by immersing the polymer in a solution of such compound;
(b) Heating the impregnated polymer to carbonize the polymer to produce a relic; and
(c) Heating said relic in an atmosphere containing a nitrogen-containing compound such as ammonia, to thereby produce the metal nitride.

---

This application is a continuation-in-part of copending applications Ser. No. 451,326, filed Apr. 27, 1965; Ser. No. 523,550, filed Jan. 28, 1966; Ser. No. 523,549, filed Jan. 28, 1966, and Ser. No. 576,840, filed Sept. 2, 1966. The foregoing applications are continuations-in-part of Ser. No. 320,843, filed Nov. 1, 1963. Ser. Nos. 320,843, 451,326, 523,550 and 523,549 are now abandoned.

This invention relates to fibers, textiles and shaped articles composed of metal nitrides and to a process for producing such fibers, textiles and shaped articles. Prior to this invention, there was no convenient method known for the production of such fibers and textiles.

Heretofore, there has been no completely satisfactory method for producing inorganic articles of predetermined irregular or complicated shapes. Previous methods have involved machining or other shaping techniques, or in the case of foams, the use of various blowing agents. These methods were either difficult and complicated or were unable to provide close control over the final shape of the article.

It is an object of this invention to provide an improved method for producing metal nitride fibers of small diameters of less than about 30 microns, which is reproduceable. Another object is to provide such a method in which the metal nitride fibers produced are of uniform diameter, straight, smooth surfaced and free of distortions. Still another object is to provide such a method which does not require high pressure techniques. A further object is to provide metal nitride fibers of less than about 30 microns (and preferably 2 to 30 microns) diameter having a length-to-diameter ratio over 400, which are flexible and characterized by high strength at high temperatures. A still further object is to provide a variety of textile forms, including staple fibers, continuous tow and yarns, woven fabrics, batting and felts, composed of metal nitride fibers.

It is also an object of this invention to provide shaped metal nitride articles. Another object of the invention is to provide a method for producing such articles from non-fibrous organic material. Still another object is to provide a variety of films, tubes, cups and other shapes which are composed of metal nitrides.

One aspect of the novel process comprises first providing a compound dissolved in a solvent and immersing a preformed organic polymeric material in the resulting solution thereby swelling and opening the polymer interstices such that the metal compound is imbibed or absorbed in the interstices. The unimbibed metal compound is then removed from the polymer outer surfaces and the metal compound-imbibed polymer is dried. Next, the latter is first heated to temperatures in the range of about 300° C. to about 400° C. at a rate sufficiently low to evolve volatile decomposition products of the polymer without destroying the polymer integrity. This pyrolysis step is continued for a sufficient duration to decompose the organic structure of the polymer and form a carbonaceous relic containing the metal in finely dispersed form. In the final step, the relic from the pyrolysis step is further heated to temperatures of about 650° C. to about 2000° C. in contact with vapors of a nitrogen-containing compound to cause reaction of metal within the carbonaceous relic with the nitrogen compound to form a metal nitride fiber, textile, or shaped article. There results a microcrystalline metal nitride material which has essentially the same physical shape as the original organic polymer.

Without being bound by same, the theory and mechanism of this process appears to be as follows: Microscopically, organic polymers such as rayon fiber are composed of extremely small crystallites of cellulosic chains (micelles or microfibrils) held together in a matrix of amorphous cellulose. The crystallites, approximately 40 Angstrom units (A.) in diameter and 250 A. long in high-tenacity rayon yarns, are parallel to the axis of the rayon fiber and are spaced approximately 20 A. apart in the dry state. A one-denier fiber (1 gram weight per 9000 meters of length) has several million crystallites in its cross-section. When the fiber is immersed in a solvent such as water or aqueous solutions, it swells laterally opening the interstices, the amorphous regions enlarge and the crystallite spacing becomes aproximately 50 A. (in the case of rayon). The dissolved selected metal compound such as a salt enters the swollen amorphous regions, which is about 85% of the volume of the swollen rayon, and becomes trapped in the amorphous regions between the crystallites when the solvent is evaporated from the fibers.

The metal compounds do not crystallize upon drying of the organic polymer, as would normally occur upon drying a solution, since they are effectively suspended and separated as islands about 50 A. in size between the crystallites.

The polymers may be imbibed with two or more metal compounds from the same solvent solution, so that nitride of more than one metal can be prepared. In the first approximation, most metal compounds enter the polymer interstices in direct proportion to their solution concentration, allowing ready control of the relative loadings of metal compounds in the organic polymer. Due to the blocking action of the organic crystallites, the metal compounds cannot segregate from each other nor crystallize during the drying and heat conversion steps. Since they are finely dispersed, the metal compounds and later the polymer relic components are extremely reactive and can be made to undergo the necessary chemical reactions to form the desired metal nitride product at relatively low temperatures.

Any organic polymeric material can be employed as a starting material in the process of this invention providing it is characterized by the above-described sequence of extremely small crystallites held together in a matrix of amorphous regions which enlarge and admit the metal compounds on immersion in the solvent. Any class of polymeric materials which are composed of long-chain molecules held together by chemical cross-links can also be used. Any cellulosic polymer can be employed including rayon, saponified cellulose acetate, cotton, cellophane, wood, and ramie. Other suitable organic polymeric materials include the protein fibers (wool and silk) and the man-made acrylics, polyesters, vinyls and polyurethanes. Certain organic polymers such as polyethylene and polypropylene are not suitable for practicing the instant process because they cannot be swollen for imbibition of the metal compounds and/or the polymers melt and lose their physical nature. A preferred cellulosic material is rayon fiber due to its structural uniformity, good imbibition characteristics and low impurity content.

The physical form of the elemental metal nitride fiber, textile, or shaped article is essentially the same as and is determined by the physical form of the preformed organic polymeric starting material. During conversion of a metal compound-imbibed organic fiber to the metal nitride fiber, the length of the fiber shrinks to approximately 40 to 60 percent and the diameter to 25 to 35 percent of the original dimensions. Where a yarn composed of a multiplicity of continuous-length metal nitride fibers is desired, a continuous-filament organic yarn is employed as the starting material in the process of this invention. Similarly, where a woven fabric or felt composed of metal nitride fibers is desired, a woven organic fiber cloth or felt can be used as the starting material. Of course, metal nitride woven textiles can be made using conventional textile equipment and techniques starting with metal nitride staple fibers or yarns made by the process of this invention. Similar shrinkage in all dimensions takes place with the non-fibrous shapes. The term "preformed," as used herein, means that the organic polymeric material has been fabricated into a fibrous or non-fibrous shape prior to impregnation with the metal compound.

In order to obtain adequate tensile strength in the final metal nitride product, cellulosic polymers are imbibed with the metal compounds to the extent of at least one-quarter mole and preferably 1.0 to 2.0 moles of the metal compound(s) in each "base mole" of cellulose. The term "base mole," as used herein refers to the molecular weight of a glycosidic unit of the cellulose chain (molecular weight of 162). With noncellulosic polymers, the degree of imbibition should be at least 0.1 and preferably 0.5–1.0 gram-equivalent metal ion in the metal compound imbibing solution per gram of organic polymer. With lower concentrations of metal compound(s), insufficient metal salt is available in the polymer relic for a strong article and the process becomes less efficient in terms of metal nitride yield per unit weight organic polymer starting material. Another disadvantage of low metal compound concentrations is that more drastic reaction conditions are necessary to achieve pyrolysis.

Imbibition or impregnation of the organic polymer can be carried out by several methods. Where the metal element which will appear in the final metal nitride product has salts which are highly soluble in water, the imbibition step can be carried out by immersing the organic polymer in a concentrated aqueous solution of such salt. For salts which hydrolyze (acid reaction) when dissolved in water, the acidity of the impregnating solution is preferably not greater than 1.0 molar in hydrogen ion in order to prevent degradation of the organic polymer during immersion. The acid may be neutralized with ammonia, if desired.

Preswelling the cellulosic organic polymers in water prior to immersion in concentrated imbibing solutions is preferably employed to increase both the rate and extent of salt imbibition. Water is also suitable for swelling protein polymers. For acrylic and polyester polymers, aromatic alcohols are suitable swelling agents, and the ketones are useful in swelling vinyl and polyurethane polymers for the same purpose.

Water is the preferred solvent for metal compound-imbibing of cellulosic and protein fibers such as wool and silk. Other solvents such as alcohols do not afford as efficient swelling of the fibers nor solubility of the selected metal compound for a high degree of imbibing. For vinyl and polyurethane fibers, esters and ketones are appropriate solvents, as for example normal butyl acetate or methyl ethyl ketone. For acrylic and polyester fibers, suitable solvents for the metal compound imbibition include aromatic alcohols and amines such as aniline, nitrophenol, meta-cresol and paraphenyl-phenol.

Immersion times at normal temperatures (21–23° C.) required to give adequate imbibition vary from 30 minutes to several days depending on the salt(s) employed and the type of organic polymer employed. Immersion times greater than about 3 days in concentrated salt solutions are undesirable for fibers since the organic fiber may degrade, resulting in a decrease in the amount of metal compound absorbed and causing the fibers to bond to each other. When it is desired to increase the rate of imbibition of the metal compound in the organic polymers to shorten the immersion time, the metal compound solution may be heated to as high as 100° C.

One method of impregnating rayon fibers with certain important metals is to absorb water into rayon and then contact the rayon with a compound of the metal so that it penetrates the fiber and hydrolyzes or reacts with the absorbed water to form insoluble metal oxide products. The metal oxide product remains in the fiber matrix without greatly disturbing the fibrous character of the rayon. The extent or amount of metal deposited within the fiber is directly a function of the amount of water absorbed in the rayon. Typical hydrolysis reactions are described by the following equations:

$$SiCl_4 + 3H_2O \rightarrow H_2SiO_3 + 4HCl$$
$$TiCl_4 + 2H_2O \rightarrow TiO_2 + 4HCl$$
$$2BF_3 + 3H_2O \rightarrow B_2O_3 + 6HF$$

The amount of water absorbed in the rayon fibers is readily controlled by exposing the fibers to air containing the desired amount of moisture. For maximum water absorption the rayon fibers may be immersed directly in liquid water. The amount of water absorbed in textile-grade viscose rayon in equilibrium with moisture in air and liquid water at 75° F. is shown below:

| Relative humidity at 75° C: | Moisture content, percent of dry fiber weight |
|---|---|
| 10 | 4 |
| 30 | 8 |
| 50 | 10 |
| 70 | 14 |
| 80 | 17 |
| 90 | 23 |
| 95 | 30 |
| 100 (immersed in water) | 80–110 |

Some hydrolyzable metal compounds are liquid at normal conditions and the water-laden rayon may be immersed directly in the metal compound to cause the hydrolysis product to be formed in the fiber. Examples of such liquids are $SiCl_4$, $TiCl_4$, $VOCl_3$, $VCl_4$. However, many of the hydrolysis reactions proceed very rapidly with the evolution of heat. The resulting severe conditions may degrade or break up the fibers; in this event the metal compound is preferably diluted with a non-reactive, miscible liquid to avoid such conditions. Many non-polar organic liquids, such as benzene, toluene, hexane, carbon tetrachloride, chloroform, are suitable non-reactive liquids. These organic liquids, when used as diluents for the metal compounds, slow the rates of hydrolysis and help to dissipate the heat of reaction. Unreacted metal compound liquid (as well as any diluent) may be removed from between the fibers by evaporation, since they have high vapor pressures.

Other metal compounds which have been incorporated in polymers by hydrolysis reaction but are not normally liquids are best utilized when dissolved in a nonreactive liquid, which is immiscible with water. Such metal compounds, for example, include $NbCl_5$, $ZrCl_4$, $UCl_4$. Suitable solvents are bromoform, carbon tetrachloride, diethyl ether, nitrobenzene.

Following imbibition with metal compound(s) from a solvent solution, it is necessary to remove excess solution from between the organic fibers before they dry in order to avoid bonding together of fibers by caked salt, or from the surfaces of nonfibrous shapes in order to prevent accumulation of caked salt on the surfaces of the shape. Allowing excess unimbibed metal or hydrolysis product to remain results in reduced strength and increased brittleness in the final metal nitride product. Blotting thoroughly with absorbent paper or cloth using moderate pressure is useful for removing excess solution from the organic material. In addition, washing, high velocity gas streams, vacuum filtration and centrifugation have proven to be effective methods for removing excess impregnating solution. For solutions, such as 3.0 molar $AlCl_3$, having viscosities greater than about 10 centipoises, raising the temperature of the organic material to 50–60° C. aids in removing excess solution.

The impregnated organic polymeric material is then thoroughly dried by any convenient means, such as air drying or heating in a stream of warm gas. It is desirable to dry the impregnated polymer rapidly (in about one hour or less) to prevent expulsion of salt from the interior of the organic material to its surface.

When a product containing two or more metal nitrides is desired, the organic material is impregnated with two or more salts or hydrolysis products. If two or more water-soluble salts are employed, the impregnation can be carried out by a single immersion in an aqueous solution containing both salts. When two nitrides are desired, one of which is impregnated into the organic material from aqueous solution and the second impregnated by hydrolysis of the metal halide or oxyhalide from organic solution, a preferred method is to impregnate first with the hydrolysis product and then with the water soluble salt.

In the next step of the process of this invention (decomposition of the organic polymer structure), the metal compound-imbibed organic polymer is heated under controlled conditions, namely: (1) to temperature in the range of 300° C. to 400° C. (2) at rate sufficiently low to evolve volatile decomposition products of the polymer without destroying the polymer integrity, (3) for a sufficient duration to decompose the organic structure of said polymer and form a carbonaceous relic containing the metal in finely dispersed form.

It is necessary to heat the metal compound-imbibed polymer at rate sufficiently low to avoid ignition of the polymer. If the organic polymer burns instead of carbonizes, the metal compound temperature rises excessively, due to its contiguous relation to the organic structure. Under such circumstances it is impossible to control the temperature and the melting point of intermediate metal compounds formed may be exceeded, and excessive crystallization and grain growth occurs. Also, the metal compound may be suspended in the organic compound vapors, and thus lost from the environment and unavailable to form the desired relic. Also, when ignition is avoided the products have smoother surfaces, are more free to bend independent of neighboring fibers, and are stronger. That is, very rapid heating and expulsion of the decomposition gases causes polymer continuity to be broken and results in excessive crystallization in the relic which do not yield as smooth, flexible and strong metal nitride products as the unignited amorphous or poorly-crystalline more dense polymer relic.

The first heating step is normally performed in a nonoxidizing inert atmosphere, as for example that provided by nitrogen, helium, argon, neon and the like, or a vacuum. However, if it is desirable to reduce the quantity of carbon remaining from the polymer pyrolysis step, a portion or all of this first heating step may be performed in an oxygen-containing atmosphere, preferably with between about 5 and about 25 volume percent oxidizing gas. The balance of the gaseous atmosphere comprises gases which are chemically nonreactive with the environment, as for example, the previously mentioned inert gases. In the event that an oxygen-containing gas is used, a portion of the carbon is removed as a carbon-containing gas through reaction with the oxidizing gas (volatilized).

The heating rate is affected by the environment whether inert or oxidizing, the latter being more difficult to control. In a nonoxidizing atmosphere the heating rate may be at least 100° C. per hour or higher, as long as polymer ignition is avoided. It is preferred to heat the polymer at a rate between 10° C. per hour and 100° C. per hour in an atmosphere containing from 5 to 25 volume percent oxygen, although higher heating rates may be satisfactory with effective means for venting the carbon-containing gas. Higher oxygen concentrations may be suitable, particularly during the latter portion of the first heating step. The preferred oxidizing gas is oxygen, although other oxidizing gases such as nitrogen dioxide and sulphur trioxide can be used if desired.

When heating of the imbibed polymers is first begun (even in an oxidizing atmosphere), pyrolysis of the polymer to carbon is the predominant chemical reaction. The carbonized organic polymer comprises predominantly carbon but also can include small amounts of residual oxygen and hydrogen. If the heating continues and in an oxidizing atmosphere, oxidation of the carbon becomes the predominant reaction.

In the final (nitride formation) process step of this invention, the polymer relic from the first heating-pyrolysis step is further heated to temperature of between about 650° C. and 2000° C. in contact with a nitrogen-containing compound to cause reaction of the metal in the carbonaceous polymer relic with the nitrogen compound to form a microcrystalline metal nitride fiber, textile, or shaped article. The nitride products formed at the relatively lower temperatures tend to be relatively amorphous in nature, while the nitride products formed at the relatively higher temperatures tend to be microcrystalline. The rate of heating in the nitride formation step is not critical; rates of between about 200° C. per hour and 1000° C. per hour have been found suitable. Similarly the overall duration of the nitride formation step is not critical; rates of between about 200° C. per hour and 1000° C. per hour have been found suitable. Similarly the overall duration of the nitride formation step is not critical, and, for example, periods of between about one and four hours can be employed in a batch process. Much shorter times can be employed in a continuous process.

As previously indicated, any metal having a stable nitride may be used to practice the invention. Such metals include elements of Groups III–B, IV–B, V–B and VI–B of the Periodic Table, the lanthanide and actinide elements, and the elements boron, aluminum, berylium and silicon. A group of particularly useful elements because of the relatively high melting or sublimation points of their nitrides are boron, silicon, titanium, hafnium, zirconium and uranium.

Many nitrogen compounds can be employed in the process of this invention as long as they are volatile at the temperature of the nitride formation step. A particularly preferred group of nitrogen-containing compounds are nitrogen gas, ammonia, and organic amines such as methylamine, piperidine, triethylamine and aniline.

The preferred process conditions in terms of reaction temperatures and molar ratios will of course vary somewhat depending on the selected metal and the nitrogen-containing compound employed. It is preferred to contact metal and nitrogen compound in at least stoichiometric amounts to produce strong, flexible products comprising a nitride of one or more metals.

The metal nitride fibers of this invention have numerous uses. For example they may be employed in a nitride fiber-plastic composite for use as heat resistant materials, and in reinforcing metals and ceramics bodies at high temperatures, particularly where high strength and low weight characteristics are desired.

Since these metal nitride fibers may be prepared in the form of woven tape and continuous yarn they may be used in filament winding.

The metal nitride shapes of this invention have a wide variety of uses. The thin films can be used as thin dielectric or heat insulating films or sheets. The metal nitride shapes of this invention can be used as light weight structural members, as heat and/or electric insulators, as battery separators, and the like. Metal nitride shapes prepared from organic foams or sponges are also useful as filters.

For use as filters it is preferred that the inorganic shapes of this invention be prepared from cellulosic foams or sponges characterized by open porosity, uniform pore size and low density.

The metal nitride films of this invention are sheets which are highly uniform in thickness and which can be as thin as 10 microns.

The following examples further illustrate the process and metal nitride fibers of this invention:

EXAMPLE 1

A 100 ft. length of Tyrex-Type rayon yarn, made up of 3000 continuous-length filaments of 1.1 denier size, was immersed in an ammonium borate solution. The solution was prepared by dissolving to saturation at 23° C. boric acid in 30% ammonium hydroxide. After one hour immersion, the rayon yarn was centrifuged free of unimbibed salt and dried in a stream of warm air. The rayon dried imbibed 0.334 gm. of borate salt per gram of rayon.

The salt-loaded rayon yarn was pyrolyzed in air at a rate of 50° C./hr. to 350° C. and held at 350° C. for four hours. The carbonized yarn was next placed in a tube furnace and further heated to 1000° C. at a rate of approximately 100° C. per hr. in a stream of ammonia gas. It was observed that the nitriding reaction takes place between 650–800° C. and that between 800–1000° C. the fibers turn brown and then tan, indicating that only small traces of carbon remain in the fibers. After the nitriding reaction, the yarn was flexible and could be handled but had shrunk to 43% of its original length and weighed 16% of the original weight of the rayon. The tan fibers were amorphous as indicated by the complete absence of X-ray diffraction lines.

The boron nitride fibers developed a poorly-crystalline hexagonal structure when heated at 1300° C. in vacuum for ½ hour. The fibers did not change shape by this heat treatment but turned white. When viewed in the microscope a 1500× this fiber surface was smooth, and no visible crystallite grain structure was evident. Diameter of the fibers was 2.4 microns. The yarn product was not electrically conductive.

EXAMPLE 2

A seven foot length of Tyrex-Type rayon yarn containing 4000 continuous length filaments of 6.2 micron diameter and weighing 0.387 gram was immersed in an aqueous solution of ammonium decaborane,

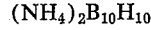
$(NH_4)_2B_{10}H_{10}$ (Inorganic Chemistry, vol. 3, p. 444, 1964.) Solution concentration was 31 gm. of boron compound per 100 ml. water. The ammonium decaborane was prepared by reacting decaborane with dimethyl sulfide to form the adduct $B_{10}H_{12} \cdot 2S(CH_3)_2$, which in turn was reacted with liquid ammonia to form the desired water soluble compound.

After blotting and drying, the yarn contained 0.403 gm. of salt per gram of rayon. The yarn was carbonized in air by heating at a rate of 50° C./hr. to 350° C. and holding at 350° C. for 4 hours. The fibers were next placed in a tube furnace and heated at 1460° C. for 3 hours in an ammonia stream of 3 std. cu. ft. per hr.

The product yarn was white to tan, weighted 0.204 gm., and had good flexibility. The fiber diameter was 2–4 microns and the surfaces were smooth. X-ray powder diffraction analysis indicated that only hexagonal boron nitride was present, but in a poorly-crystallized form.

The products of Examples 1 and 2 both contained greater than 90 percent by weight boron nitride.

What is claimed is:

1. A process for producing metal nitride fiber, textiles, and shaped articles which comprises:
   (a) providing a compound of a metal dissolved in a solvent;
   (b) immersing a preformed organic polymeric material in the metal compound-containing solvent thereby swelling and opening the polymer interstices such that the metal compound is imbibed in said interstices;
   (c) removing the unimbibed metal compound from the outer surface of said polymeric material and drying the metal compound-imbibed polymer;
   (d) first heating the metal compound-imbibed polymer to a temperature between about 300° C. and about 400° C. at a rate sufficiently low to evolve decomposition products of the polymer without destroying the polymer integrity, for a sufficient duration to decompose the organic structure of said polymer and form a carbonaceous relic containing the metal in finely dispersed form; and
   (e) further heating the relic from first heating step (d) in contact with vapors of a nitrogen-containing compound to a temperature of about 650° C. to about 2000° C. to cause reaction of said metal in said relic with said nitrogen compound to form a metal nitride fiber, textile, or shaped article.

2. A process according to claim 1 in which said organic polymer is a cellulosic fiber.

3. A process according to claim 1 in which said organic polymer is rayon fiber.

4. A process according to claim 1 in which said metal is boron, silicon, titanium, hafnium, zirconium, a metal of groups III–B, IV–B, V–B, or VI–B of the Periodic Table, or a metal of the actinide elements or the lanthanide elements.

5. A process according to claim 1 wherein said metal compound is ammonium decaborane or ammonium borate.

6. A process according to claim 1 wherein said nitrogen-containing compound is ammonia.

7. Process of claim 1 wherein the metal is boron.

References Cited

UNITED STATES PATENTS

| | | | |
|---|---|---|---|
| 399,174 | 3/1889 | Von Welsbach | 117—33.4 |
| 575,261 | 1/1897 | Moscheles | 117—33.4 |
| 623,723 | 4/1899 | Kohl et al. | 117—33.4 |
| 2,870,000 | 1/1959 | Ryznar | 75—20 |
| 3,805,886 | 4/1963 | Grandey | 23—191 |
| 3,087,233 | 4/1963 | Turnbull | 75—200 |
| 3,180,702 | 4/1965 | Lapat | 23—347 |
| 3,244,480 | 4/1966 | Johnson et al. | 23—191 |

L. DEWAYNE RUTLEDGE, *Primary Examiner.*